United States Patent [19]

Poister

[11] Patent Number: 4,522,580
[45] Date of Patent: Jun. 11, 1985

[54] DOUGH ROLLER AND SHAPER DEVICE FOR PIE CRUSTS AND THE LIKE

[76] Inventor: Clarence E. Poister, 1000 S. Woodlawn, Wichita, Kans. 67218

[21] Appl. No.: 614,154

[22] Filed: May 25, 1984

[51] Int. Cl.³ ............ A21C 3/02; A21C 5/00; A21C 11/10
[52] U.S. Cl. .................... 425/193; 7/111; 99/DIG. 15; 425/292; 425/310; 425/328; 425/374; 425/383
[58] Field of Search ........ 425/328, 318, 374, 317, 425/436 R, 292, 310, 182, 383, 183, 193, 385; 29/110.5; 7/111; 249/112, 117

[56] References Cited

U.S. PATENT DOCUMENTS

| | | | |
|---|---|---|---|
| 2,026,829 | 1/1936 | Ellinger | 425/292 |
| 2,181,666 | 11/1939 | Molin | 425/374 |
| 2,411,857 | 12/1946 | Harriss | 426/512 |
| 2,521,982 | 9/1950 | Kors | 425/310 |
| 2,968,261 | 1/1961 | Tonkin | 425/169 |
| 3,166,027 | 1/1965 | Sprenzel | 425/183 |
| 3,322,074 | 5/1967 | Malnory | 425/195 |
| 4,345,516 | 8/1982 | Sinclair | 425/184 |

FOREIGN PATENT DOCUMENTS 886077  1/1962  United Kingdom ............... 29/110.5

Primary Examiner—Willard E. Hoag
Attorney, Agent, or Firm—Edwin H. Crabtree

[57] ABSTRACT

A dough roller and shaper device for making pie crust, pizza crust, cookies and other food crusts. The device characterized by having a molded ring in a dough board for making quickly, with a standard rolling pin, crust uniform in size and thickness. The device can be used for making a bottom crust and a top crust when baking a pie in a pie pan.

9 Claims, 7 Drawing Figures

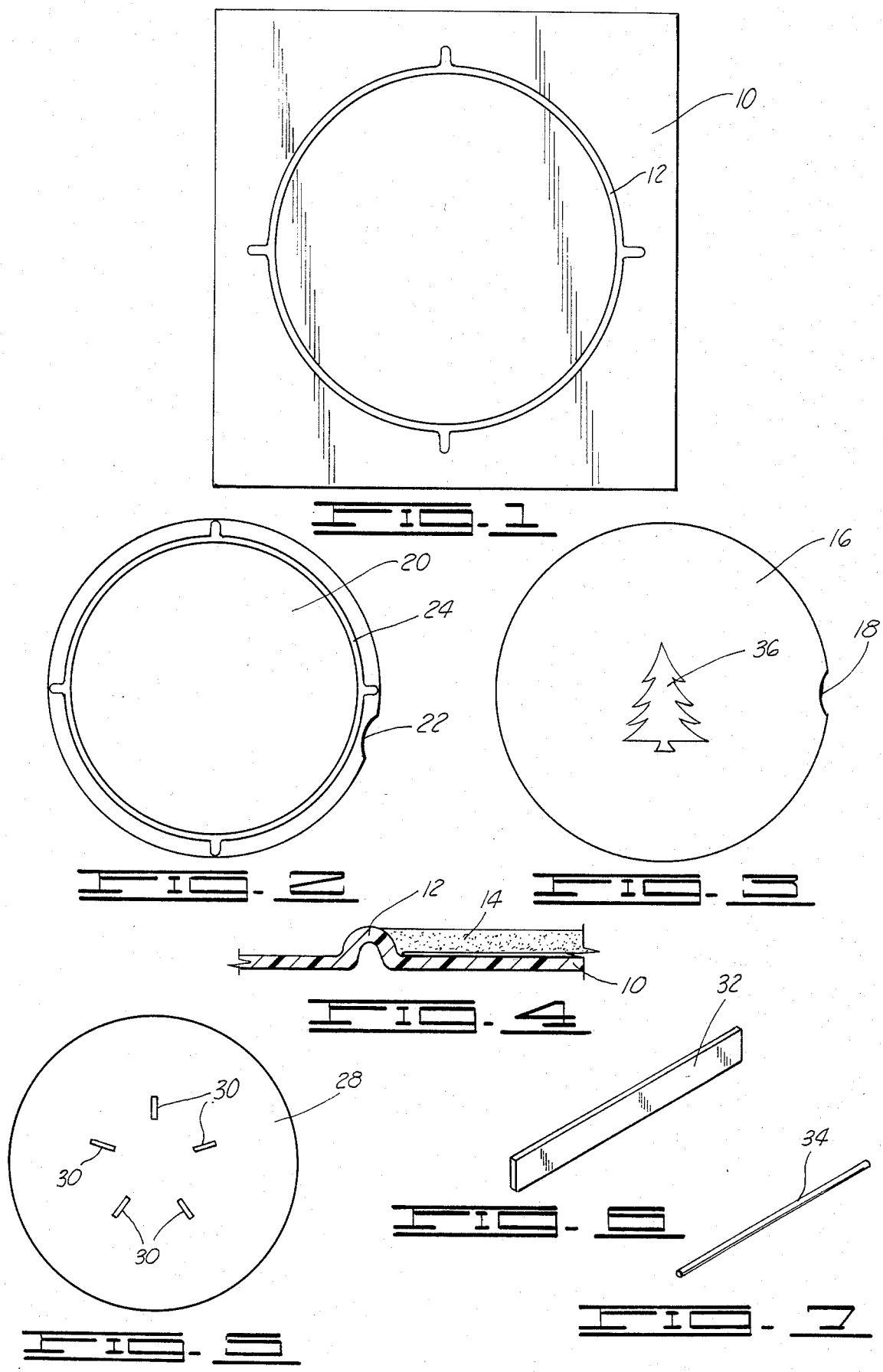

DOUGH ROLLER AND SHAPER DEVICE FOR PIE CRUSTS AND THE LIKE

BACKGROUND OF THE INVENTION

This invention relates to a dough roller and shaper device for forming dough and more particularly, but not by way of limitation, for the making of a top and bottom crust used in an annular shaped pie pan.

Heretofore, a rolling pin has been used in a kitchen to shape dough into pie crusts. The crusts are sometimes rolled too thin or too thick with the edges being too short to cover the pie pan, or so long that the extra dough more than covered the pan. Extra dough must then be reshaped which sometimes alters the texture of the crust. Also extra time was involved in reshaping, causing frustration to bakers and pie makers.

In U.S. Pat. No. 2,026,829, U.S. Pat. No. 2,411,857, U.S. Pat. No. 2,968,261, U.S. Pat. No. 3,322,074 and U.S. Pat. No. 4,345,516 various types of pie pans, pie crust templets and dough cutting apparatus are disclosed. None of them provide the unique features and advantages of the subject dough roller and shaping device for pie crusts and the like as described herein.

SUMMARY OF THE INVENTION

The subject dough roller and shaper device for pie crusts and the like rolls and shapes dough into a uniform thickness and in a perfect shape to form an upper and lower crust for a pie. Also, the roller and shaper device is simple in design, efficient and preserves the texture of the dough.

Further, the dough roller and shaper device can be used for making various sizes of pies, pizzas, cookies and other foods requiring a dough crust.

The dough roller and shaper device for making a pie crust and the like includes a dough board having a molded ring therein. A first removable dough support disc is received within the molded ring and is used for removing the bottom crust when the dough has been rolled on the dough board and formed into an annular shape by the molded ring. Also the device includes a second removable dough support disc having an annular ring therein. The second support disc is used for forming a smaller top crust placed on the top of a pie filling and the bottom crust. Also the device includes an annular shaped steam vent disc which is placed over the top crust after it is formed on the second support disc. The vent disc is used for receiving a vent tool which is used to form steam vents in the top crust.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates the dough board having a molded ring therein.

FIG. 2 illustrates the second removable dough support disc having an annular molded ring therein.

FIG. 3 illustrates the first removable dough support disc.

FIG. 4 illustrates a partial cross section of the dough board with a crust rolled and formed thereon.

FIG. 5 illustrates the steam vent disc.

FIGS. 6 and 7 illustrate vent tools used with the steam vent disc.

DETAILED DESCRIPTION OF THE DRAWINGS

In FIG. 1 part of the dough rolling and shaping device is shown which includes a dough board 10 having an annular shaped ring 12 molded therein. The diameter of the ring 12 may vary, but for a pie it would be in the range of 8 to 9 inches. A larger ring would be used for pizzas and a smaller ring for cookies and other crust items.

In operation the pie maker may use a polyethylene film or similar material to spread over the top of the dough board 10 and secured to the sides of the board 10. The film can also be spread over the top of the dough. The dough is then mashed in all directions from the center of the ring 12 using a rolling pin, fingers or fist. The dough is then rolled with the rolling pin in all directions from the center outwards covering the ring. It should be noted that the ring 12 supports the rolling pin and the dough. A portion of the dough is shown in FIG. 4 and designated by reference numeral 14. When the dough 14 has been rolled on the board 10, the dough will be uniform in thickness. If there is not enough dough to fill the area within the ring 12, additional dough may be placed in the voids from dough outside the ring or from additional dough stock.

The ring 12 is integrally molded in the board 12 and extends upwardly to a desired height. The height of the ring 12 may vary depending on the thickness of the crust desired.

It should be mentioned that while the use of a plastic film may be used in conjunction with the roller and shaper device, the film is not shown in the drawings and may or may not be used depending on the desire of the pie maker. The film does aid in preventing the sticking of the dough 14 and in cleanness of the pie making and cleanup afterwards.

Prior to the placing of the dough 14 inside the ring 12 a first removable dough support disc 16 shown in FIG. 3 and having a notch 18 in the side thereof is placed inside the ring 12. The disc 16 has a diameter approximately the same size as the diameter of the ring 12. When the dough 14 has been completely rolled to a uniform thickness using the dough board 10, a finger is inserted under the notch 18 and the dough 14 is removed, being supported by the disc 16 and using both hands the dough is turned upside down and positioned onto the bottom and sides of a pie pan. The pie pan is not shown in the drawing and is not part of the invention.

Through the use of the dough board 10, the ring 12 and the first removable dough support disc 16, a bottom pie crust having a uniform thickness and annular shape is correctly inserted into the bottom of the pie pan without holes or breaks in the dough.

In the making of a top crust for a pie which normally has a smaller diameter than the bottom crust, a second removable dough support disc 20 having a notch 22 in the side thereof and an annular ring 24 therein is placed inside the annular ring 12 of the dough board 10. The disc 20 is shown in FIG. 2. Again, the dough is rolled uniformly and evenly from the center of the disc 20 and the ring 24. The ring 24 of the disc 20 has a smaller diameter than the ring 12 of the dough board 10.

When the top crust has been completed, a steam vent disc 28 shown in FIG. 5 and having a plurality of steam vents 30 therein is placed over the top crust formed inside the ring 24. Using either a rectangular shaped tool 32 as shown in FIG. 6 or a circular shaped rod 34, one of the tools are inserted into the vents 30 punching holes in the top crust thus forming steam vents therein. Note, the vents may be of various geometric forms and indexed around the circumference of the disc 28 to act as guides in dividing the pie equally.

When the top crust has been completed using the second dough support disc 20 inside the ring 12 and the steam vent disc 28, the second dough support disc 20 using the notch 22 is removed from the dough board 20. The second support disc 20 is turned upside down and removed with the top crust now received on top of the steam vent disc 28. The steam vent disc 28 and the top crust are then centered over the pie pan with the bottom crust having received pie filling therein. The top crust is then lowered over the top of the pie filling and the steam vent disc 28 is removed. The pie is then completed by fluting, crimping or cutting away the top crust against the top of the bottom crust positioned around the sides of the pie pan. Using the dough board 10 with ring 12 and the discs 16, 20 and 28, it can be appreciated that various types of crust can now be made uniform in size, thickness and texture greatly improving the efficiency of pie making to the enjoyment of the baker and homemaker.

While the dough board 10 shown in FIG. 1 has been described with ring 12, it can be appreciated that the board 10 could also have any type of raised pattern of different shapes for receiving the dough 14 therein. The pattern would support the rolling pin and separate the excess dough outside the pattern. Further, a removable disc having the shape of the pattern would be received therein. The disk may include a recess similar to a christmas tree 36 shown in FIG. 3 or any other artistic shape for decorating a dough crust during certain holidays and seasonal occasions.

Changes may be made in the construction and arrangement of the parts or elements of the embodiments as described herein without departing from the spirit or scope of the invention defined in the following claims.

What is claimed is:

1. A dough roller and shaper device for making pie crust and the like, the device comprising: a roller a dough board having a molded ring therein; and first and second removable dough support discs received within the molded ring, said second disc having a molded ring therein.

2. The device as described in claim 1 wherein the first and second removable discs include a notch in the side thereof, the notch used for ease in removing the discs from the dough board.

3. The device as described in claim 1 wherein the molded ring is annular in shape.

4. The device as described in claim 3 wherein the first support disc has a diameter approximately the same as the diameter of the molded ring in the dough board.

5. A dough roller and shaping device for use with a rolling pin in making pie crust and the like, the device comprising: a dough board having an annular molded ring; a first removable dough support disc annular in shape and received in the dough boards molded ring; and a second removable dough support disc annular in shape and received in the dough boards molded ring, the second disc having an annular molded ring therein, the discs each having a notch adjacent one edge to facilitate removal of the discs.

6. The device as described in claim 5 further including an annular steam vent disc having vents therein, the vent disc received in the molded ring of the second dough support disc.

7. The device as described in claim 6 further including a vent tool, the vent tool dimensioned for receipt in the vent in the vent disc for forming openings and steam vents in the pie crust.

8. A dough roller and shaper device for making pie crusts and the like, the device comprising: a dough board having a raised ring like pattern thereon, the dough received inside the pattern and rolled by a standard rolling pin, the pattern supporting the rolling pin and separating the excess dough outside the pattern; and a first removable dough support disc received in the pattern and having the same configuration as the pattern, the discs each having a notch adjacent one edge to facilitate removal of the discs.

9. The device as described in claim 8 wherein the removable disc has a recess therein, the recess in the forms of different artistic shapes for decorating the dough crusts.

* * * * *